(12) United States Patent
Ishinoda et al.

(10) Patent No.: US 12,174,031 B2
(45) Date of Patent: Dec. 24, 2024

(54) PARKING ASSISTANCE DEVICE AND PARKING ASSISTANCE METHOD

(71) Applicant: Faurecia Clarion Electronics Co., Ltd., Saitama (JP)

(72) Inventors: Makoto Ishinoda, Saitama (JP); Koki Yamazaki, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 39 days.

(21) Appl. No.: 17/555,597

(22) Filed: Dec. 20, 2021

(65) Prior Publication Data
US 2022/0196422 A1 Jun. 23, 2022

(30) Foreign Application Priority Data

Dec. 21, 2020 (JP) ................................. 2020-211471

(51) Int. Cl.
*G01C 21/34* (2006.01)
*G01C 21/00* (2006.01)

(52) U.S. Cl.
CPC ..... *G01C 21/3476* (2013.01); *G01C 21/3807* (2020.08)

(58) Field of Classification Search
CPC ............ G01C 21/3476; G01C 21/3807; G01C 21/3679; G01C 21/3815
See application file for complete search history.

(56) References Cited

U.S. PATENT DOCUMENTS

| 2011/0057814 | A1* | 3/2011 | Park | B62D 15/0285 |
| | | | | 340/932.2 |
| 2013/0335553 | A1* | 12/2013 | Heger | B60Q 9/008 |
| | | | | 348/118 |
| 2015/0179075 | A1* | 6/2015 | Lee | G08G 1/165 |
| | | | | 340/932.2 |

(Continued)

FOREIGN PATENT DOCUMENTS

| JP | 2009-298179 A | 12/2009 |
| JP | 2018-176908 A | 11/2018 |
| WO | 2016/203643 A1 | 12/2016 |

OTHER PUBLICATIONS

Japanese Office Action issued on Jun. 25, 2024 in corresponding Japanese patent application No. 2020-211471.

*Primary Examiner* — Rachid Bendidi
*Assistant Examiner* — Moises Gasca Alva
(74) *Attorney, Agent, or Firm* — IP Business Solutions, LLC

(57) ABSTRACT

A parking assistance device includes a processor. The processor generates a map recording the position of an obstacle around a vehicle and the positions of parking areas available for the vehicle to park. The processor determines a parking area to park the vehicle, out of the parking areas recorded on the map, based on the generated map and the obtained position information. The processor performs a simulation on the map where the vehicle is turned until the vehicle has approximately the same orientation as the parking area and detects a contact position at which the vehicle comes into contact with the obstacle recorded on the map. The processor determines a movement direction in which the vehicle is to be moved from a position indicated by the position information, based on the contact position.

7 Claims, 10 Drawing Sheets

(56) References Cited

U.S. PATENT DOCUMENTS

| | | | |
|---|---|---|---|
| 2015/0353080 A1* | 12/2015 | Mukaiyama | E05B 77/54 |
| | | | 701/23 |
| 2016/0159397 A1* | 6/2016 | Baek | B60W 30/06 |
| | | | 701/41 |
| 2018/0162446 A1* | 6/2018 | Mikuriya | B62D 15/028 |
| 2019/0344828 A1* | 11/2019 | Omori | B60W 50/14 |
| 2020/0031397 A1 | 1/2020 | Hasejima et al. | |
| 2020/0070814 A1* | 3/2020 | Park | B62D 15/0285 |
| 2020/0166349 A1* | 5/2020 | Ogata | G01C 21/005 |
| 2020/0282975 A1* | 9/2020 | Minase | B60L 15/30 |
| 2020/0298839 A1* | 9/2020 | Inoue | B62D 15/0285 |
| 2021/0213937 A1* | 7/2021 | Imai | B60W 30/09 |
| 2022/0332308 A1* | 10/2022 | Suzuki | B60W 30/06 |

* cited by examiner

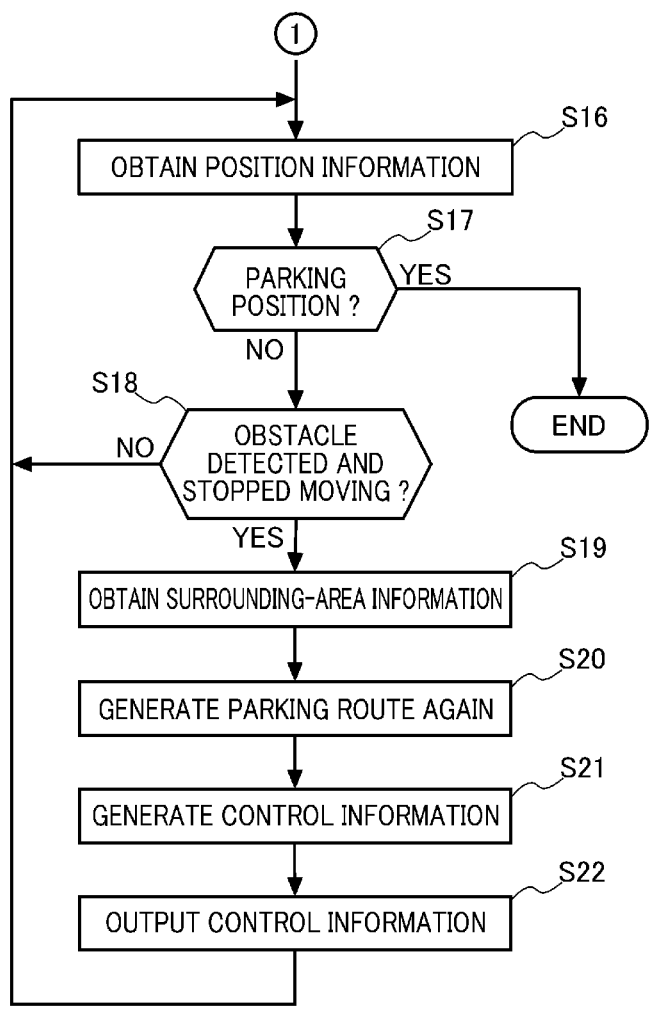

PARKING ASSISTANCE DEVICE AND PARKING ASSISTANCE METHOD

INCORPORATION BY REFERENCE

The present application claims priority under 35 U.S.C. § 119 to Japanese Patent Application No. 2020-211471 filed on Dec. 21, 2020. The content of the application is incorporated herein by reference in its entirety.

BACKGROUND OF THE INVENTION

Field of the Invention

The present invention relates to parking assistance devices and parking assistance methods.

Description of the Related Art

There has been known a conventional parking assistance device that assists parking of a vehicle.

For example, Japanese Patent Laid-Open No. 2018-176908 discloses a parking assistance device that computes a first parking route for starting moving a host vehicle forward from an initial position of the host vehicle and a second parking route for starting moving the host vehicle backward from the initial position of the host vehicle, selects one of the first parking route or the second parking route on the basis of a preset evaluation function, and sets the selected route as a parking route to be used.

SUMMARY OF THE INVENTION

However, in the case of computing both the route for moving the vehicle forward and the route for moving the vehicle backward, the processing load for route calculation is large, requiring much time for route computation.

An object of the present invention is to provide a parking assistance device and a parking assistance method that require less calculation time to generate parking routes.

To achieve the above object, a parking assistance device according to an aspect of the present invention includes: an input-output interface connected to external devices; a condition obtaining unit configured to obtain a surrounding condition around a vehicle and position information on the vehicle via the input-output interface, the surrounding condition being detected by a detection device which is one of the external devices, the position information being calculated by a position detection unit which is one of the external devices; a map generation unit configured to generate a map that records the position of an obstacle around the vehicle and the positions of parking areas available for the vehicle to park, based on the obtained surrounding condition; a parking-area determination unit configured to determine a parking area to park the vehicle out of the parking areas recorded on the map, based on the generated map and the obtained position information; a contact detection unit configured to perform a simulation on the map in which the vehicle is turned until the vehicle has approximately the same orientation as the parking area and detect a contact position at which the vehicle comes into contact with the obstacle recorded on the map; and a movement-direction determination unit configured to determine a movement direction in which the vehicle is to be moved from a position indicated by the position information, based on the contact position detected by the contact detection unit.

An aspect of the present invention makes it possible to reduce the calculation time necessary to generate parking routes.

BRIEF DESCRIPTION OF THE DRAWINGS

FIG. 10 is a flowchart illustrating the operation of the parking assistance device.

DETAILED DESCRIPTION OF THE PREFERRED EMBODIMENTS

The following describes embodiments of the present invention with reference to the attached drawings.

Figure 1:
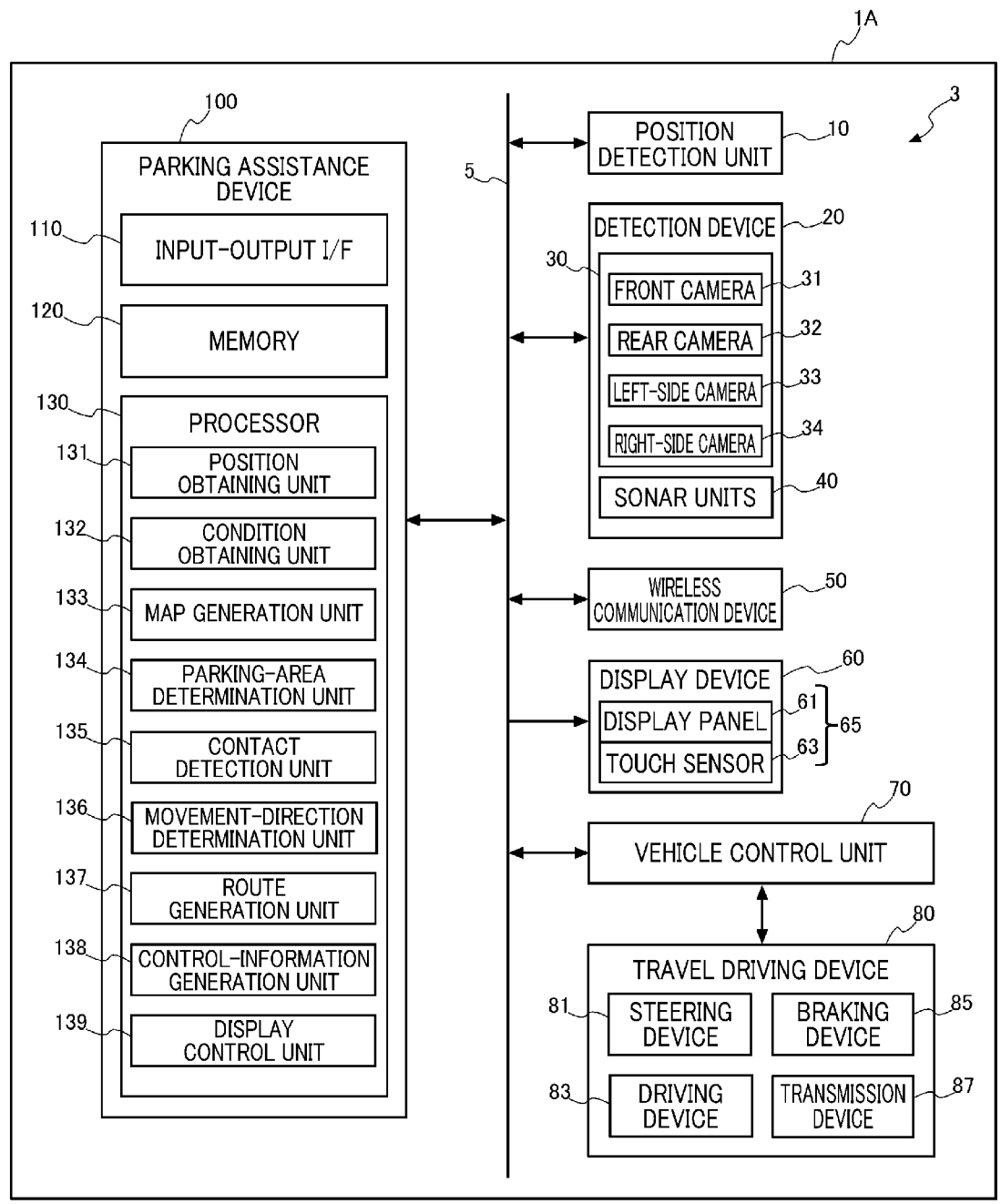
FIG. 1 is a block diagram illustrating the configuration of an in-vehicle device.

FIG. 1 is a diagram illustrating the configuration of an in-vehicle device 3 mounted on a vehicle. In the following, the vehicle on which the in-vehicle device 3 is mounted is referred to as a host vehicle 1A.

The in-vehicle device 3 includes a position detection unit 10, a detection device 20, a wireless communication device 50 (transmitter/receiver, circuit), a display device 60, a vehicle control unit 70, a travel driving device 80, and a parking assistance device 100.

The position detection unit 10 detects the current position of the host vehicle 1A. The position detection unit 10 includes a global navigation satellite system (GNSS) receiver and a processor (both of which are not illustrated). The GNSS receiver receives signals transmitted from satellites. The processor calculates the latitude and the longitude, which are position information on the host vehicle 1A, based on the signals received by the GNSS receiver, and the azimuth of the host vehicle 1A from the difference in the calculated position information. The position detection unit 10 outputs the position information and azimuth information on the host vehicle 1A obtained by calculation to the parking assistance device 100.

The detection device 20 includes a plurality of sensors. The detection device 20 of the present embodiment includes, as sensors, sonar units 40 and an image capturing unit 30 including a plurality of cameras.

Although the description in the present embodiment is based on a case in which the detection device 20 includes cameras and sonars, the sensors of the detection device 20 are not limited to cameras and sonars. For example, the detection device 20 may include a radar or a laser imaging detection and ranging (LiDAR) which is capable of measuring the distances to objects using radio waves, light, or the like. The detection device 20 outputs images captured by the image capturing unit 30 and sensor data from the sonar units 40 to the parking assistance device 100, as surrounding-area information indicating surrounding conditions.

The image capturing unit 30 includes a front camera 31 that captures images of the area ahead of the host vehicle 1A, a rear camera 32 that captures images of the area behind the host vehicle 1A, a left-side camera 33 that captures images of the area on the left side of the host vehicle 1A, and a right-side camera 34 that captures images of the area on the right side of the host vehicle 1A. These cameras each include an image sensor such as a charge-coupled device (CCD) or a complementary metal-oxide-semiconductor (CMOS) and a data processing circuit that generates an image from the light receiving state of the image sensor. In the image capturing unit 30, the angles of views of the four cameras are adjusted such that the range of 360 degrees around the host vehicle 1A can be captured by the four cameras. The front camera 31, the rear camera 32, the left-side camera 33, and the right-side camera 34 each capture images of the respective image capturing ranges at a specified frame rate to generate captured images. The front camera 31, the rear camera 32, the left-side camera 33 and the right-side camera 34 output the generated captured images to the parking assistance device 100.

The sonar units 40 are mounted at a plurality of locations such as at the front, rear, right side, left side, and like of the host vehicle 1A and detect objects around the host vehicle 1A using ultrasound. Specifically, the sonar units 40 detect the positions of objects and the distances to the objects.

The wireless communication device 50 follows control by the parking assistance device 100 and performs wireless communication according to a wireless communication standard such as Wi-Fi (registered trademark).

The display device 60 includes a touch panel 65. The touch panel 65 includes a display panel 61 and a touch sensor 63. The display panel 61 employs, for example, a liquid crystal display, an organic EL display, or the like. The touch sensor 63 employs a sensor of a commonly known type, such as a resistive type or a capacitive type. The touch sensor 63 detects touch operations performed on the display panel 61 and generates position signals indicating the operation positions of the detected touch operations. The touch sensor 63 outputs operation information including generated position signals to the parking assistance device 100.

The vehicle control unit 70 is, for example, a computer device such as an electronic control unit (ECU) and is a unit that controls the travel driving device 80 mounted on the host vehicle 1A. The travel driving device 80 includes a steering device 81, a driving device 83, a braking device 85, and a transmission device 87. The vehicle control unit 70 is connected to the steering device 81, the driving device 83, the braking device 85, and the transmission device 87, and the parking assistance device 100 via a communication bus 5 supporting a standard such as Ethernet (registered trademark), Controller Area Network (CAN), or Local Interconnect Network (LIN). The vehicle control unit 70 controls the steering device 81, the driving device 83, the braking device 85, and the transmission device 87, according to control information inputted from the parking assistance device 100.

The steering device 81 includes an actuator that steers the steering wheel of the host vehicle 1A.

The driving device 83 includes an actuator that adjusts the driving force of the driving wheels of the host vehicle 1A. In the case in which the power source of the host vehicle 1A is an engine, this actuator corresponds to the throttle actuator, and in the case in which the power source is a motor, this actuator corresponds to the motor.

The braking device 85 includes an actuator that controls the brake system provided on the host vehicle 1A based on information from the parking assistance device 100 and controls the braking force applied to the wheels of the host vehicle 1A.

The transmission device 87 includes a transmission and an actuator. The transmission device 87 drives the actuator and controls the shift position of the transmission to switch the gear ratio of the transmission and the forward and backward travel of the host vehicle 1A.

The parking assistance device 100 is a computer device including an input-output interface 110 (CAN transceiver, transceiver), a memory 120, and a processor 130. The parking assistance device 100 may include, in addition to these devices, a storage device such as a hard disk drive (HDD) or a solid state drive (SSD).

The input-output interface 110 is connected to the communication bus 5 and performs data communication with external devices connected to the communication bus 5. The external devices include the position detection unit 10, the detection device 20, the wireless communication device 50, the display device 60, and the vehicle control unit 70.

The memory 120 includes read only memory (ROM) and random access memory (RAM). The memory 120 may be nonvolatile semiconductor memory such as flash memory. The memory 120 stores computer programs executed by the processor 130, data to be processed at the time when the processor 130 executes the computer programs, and data on processing results. The memory 120 also stores images captured by the image capturing unit 30 and sensor data outputted from the sonar units 40. In addition, the memory 120 stores a map generated by a map generation unit 133 described later.

The processor 130 includes a central processing unit (CPU), a microprocessor unit (MPU), or the like.

The parking assistance device 100 includes, as functional components, a position obtaining unit 131, a condition obtaining unit 132, the map generation unit 133, a parking-area determination unit 134, a contact detection unit 135, a movement-direction determination unit 136, a route generation unit 137, a control-information generation unit 138, and a display control unit 139. These functional components are the functions implemented by the processor 130 executing computer programs and performing calculation.

The position obtaining unit 131 receives input of the position information and azimuth information on the host vehicle 1A, calculated by the position detection unit 10. The position obtaining unit 131 corrects the position information and azimuth information inputted from the position detection unit 10 by using a well-known dead reckoning method. The position obtaining unit 131 outputs the corrected position and azimuth information to the map generation unit 133 and the route generation unit 137.

The condition obtaining unit 132 makes the image capturing unit 30 capture images and obtains the captured images generated by the image capturing unit 30 as surrounding-area information. The condition obtaining unit 132 temporarily stores the obtained captured images in the memory 120.

The condition obtaining unit 132 also makes the sonar units 40 execute sensing to obtain sensor data, which is the detection results by the sonar units 40, as surrounding-area information. The condition obtaining unit 132 temporarily stores the obtained sensor data in the memory 120.

The map generation unit 133 generates a map indicating the conditions around the host vehicle 1A in the memory 120, based on the position information and the azimuth information inputted from the position obtaining unit 131 and the captured images and sensor data stored in the memory 120. Recorded on the map are the current position of the host vehicle 1A, the positions of and the distances to the objects around the host vehicle 1A, the positions of parking spots indicated by white lines or the like painted on the road surface of a parking lot, and other information. Examples of the objects recorded on the map include other vehicles parked in parking areas and structures in the parking lot such as poles. Hereinafter, these objects are referred to as target objects. Parking spots are marked with lines having a specified thickness, painted on the road surface, and thus the intervals corresponding to the thickness of the white lines are detected as a cyclic feature.

The parking-area determination unit 134 refers to the map generated by the map generation unit 133 and determines a parking area to park the host vehicle 1A. For example, the parking-area determination unit 134 determines, as the parking area, an area defined by a parking spot in which a target object is not detected and the distance to which from the host vehicle 1A is shorter than or equal to a preset set distance, out of the parking spots recorded on the map. The parking-area determination unit 134 sets the position and the azimuth of the host vehicle 1A at the time when the host vehicle 1A is parked in the determined parking area and determines a parking position P at which the host vehicle 1A is to be parked.

The contact detection unit 135 performs a simulation in which the host vehicle 1A is moved virtually on the map generated by the map generation unit 133 to determine whether the host vehicle 1A comes into contact with obstacles. To be more specific, the contact detection unit 135 turns the host vehicle 1A on the map at a preset turn angle from a position S0 of the host vehicle 1A. The contact detection unit 135 performs a simulation in which the host vehicle 1A is turned until the host vehicle 1A has the same or approximately the same azimuth as the host vehicle 1A at the time when it is parked at the parking position P. In other words, the contact detection unit 135 performs a simulation in which the host vehicle 1A is turned until the host vehicle 1A is oriented in a direction the same or approximately the same as the longitudinal direction of the parking area. The contact detection unit 135 judges whether the host vehicle 1A comes into contact with the obstacles recorded on the map while the host vehicle 1A is turning. In the case in which the contact detection unit 135 judges that the host vehicle 1A comes into contact with an obstacle, the contact detection unit 135 identifies the contact position at which the host vehicle 1A comes into contact with the obstacle.

The position S0 of the host vehicle 1A is the current position of the host vehicle 1A and is the position on the map that is indicated by the position information obtained by the position obtaining unit 131. The description in this specification is on the assumption that the term "contact" includes not only coming into contact but also colliding.

The movement-direction determination unit 136 determines the movement direction of the host vehicle 1A based on the detection result by the contact detection unit 135. The movement direction of the host vehicle 1A that the movement-direction determination unit 136 determines has four directions: "forward movement", "forward turn", "backward movement", and "backward turn".

The relationship between the detection result by the contact detection unit 135 and the movement direction of the host vehicle 1A that the movement-direction determination unit 136 determines will be described with reference to FIGS. 2 to 8. In the following, since description is made of a case of parking the host vehicle 1A at the parking position P by moving it backward or turning it backward, the movement direction of the host vehicle 1A that the movement-direction determination unit 136 determines has three directions: "forward movement", "backward movement", and "backward turn". In the case of moving the host vehicle 1A forward or turning the host vehicle 1A forward to park it at the parking position P, the movement-direction determination unit 136 selects one of three directions: "forward movement", "forward turn", and "backward movement" as the movement direction of the host vehicle 1A.

The forward movement is a route in which the host vehicle 1A is first moved forward from the position S0 of the host vehicle 1A and then turned backward, so that the host vehicle 1A is parked at the parking position P.

The forward turn is a route in which the host vehicle 1A is turned forward from the position S0 of the host vehicle 1A, so that the host vehicle 1A is parked at the parking position P.

The backward movement is a route in which the host vehicle 1A is first moved backward from the position S0 of the host vehicle 1A and then turned backward, so that the host vehicle 1A is parked at the parking position P.

The backward turn is a route in which the host vehicle 1A is turned backward from the position S0 of the host vehicle 1A, so that the host vehicle 1A is parked at the parking position P.

The parking-route generation unit 137 generates a parking route for parking the host vehicle 1A at the parking position P, based on the movement direction determined by the movement-direction determination unit 136. Details of the parking route generated by the parking-route generation unit 137 will be described later with reference to FIGS. 2 to 8.

The relationship between the position of contact with an obstacle, detected by the contact detection unit 135 and the movement direction determined by the movement-direction determination unit 136 will be described with reference to FIGS. 2 to 8.

Figure 2:
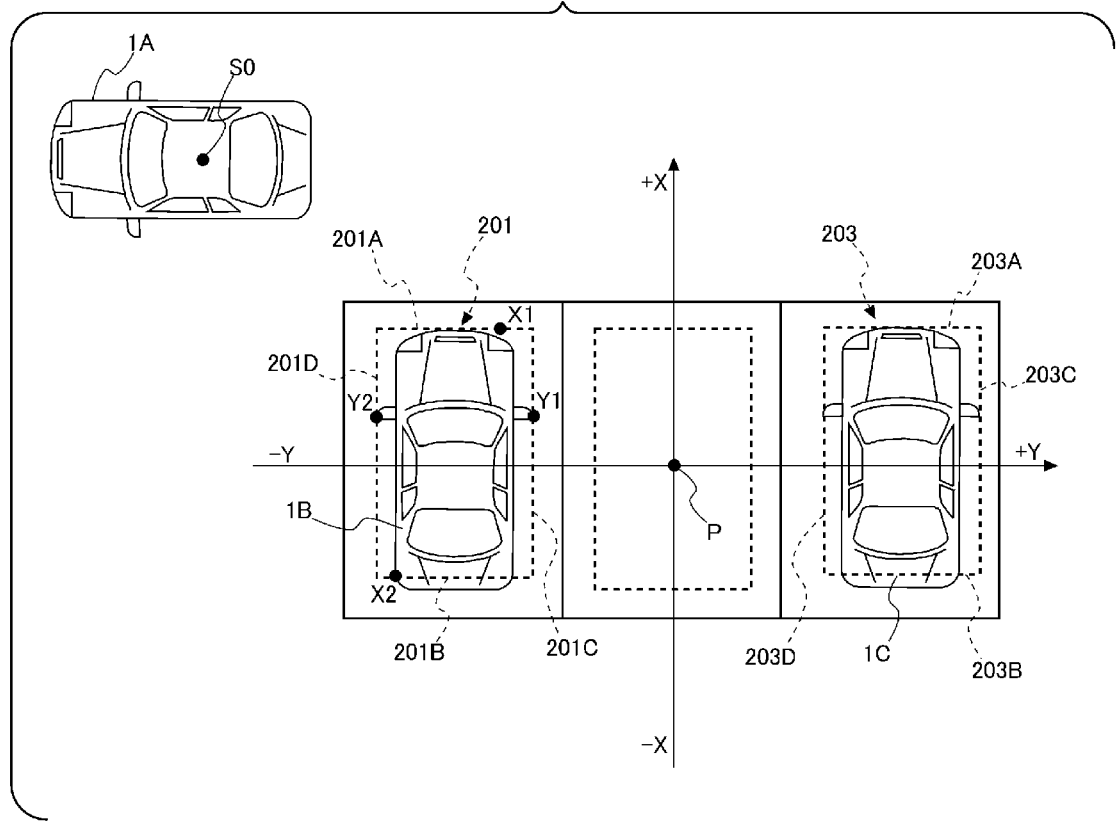
FIG. 2 is a diagram illustrating the current position of a host vehicle and a parking position.

FIG. 2 is a diagram illustrating the position S0 of the host vehicle 1A and the parking position P.

The parking position P is the position of a preset reference point of the host vehicle 1A at the time when the host vehicle 1A is parked at the parking position P. The preset reference point of the host vehicle 1A may be, for example, the center position of the vehicle-longitudinal direction and the vehicle-width direction, the position of the center of gravity of the host vehicle 1A, or the position which is at the center in the vehicle-width direction and on the front wheel axle or the rear wheel axle.

FIG. 2 illustrates a case in which a parking mode at the parking position P is perpendicular parking. Perpendicular parking is a parking mode in which when the host vehicle 1A is parked at the parking position P, the host vehicle 1A and other vehicles parked in the adjacent parking areas are lined in the vehicle-width direction of the host vehicle 1A.

In the case illustrated in FIG. 2, other vehicles are parked in the parking areas on the right and left sides of the parking position P.

The vehicle parked in the parking area closer to the position S0 of the host vehicle 1A, in other words, the parking area on the left side of the parking position P in the drawing is referred to as the "vehicle 1B", and the vehicle parked in the parking area farther from the position S0 of the host vehicle 1A, in other words, the parking area on the right side of the parking position P in the drawing is referred to as the "vehicle 1C".

In the map generated by the map generation unit 133, a forward FIG. 201 representing the vehicle 1B and indicated by dashed lines in FIG. 2 is recorded. Similarly, in the map, a backward FIG. 203 representing the vehicle 1C and indicated by dashed lines in FIG. 2 is recorded. The forward FIG. 201 is a rectangular figure indicating the range occupied by the vehicle 1B, and the backward FIG. 203 is a rectangular figure indicating the range occupied by the vehicle 1C. The map generation unit 133 generates the forward FIG. 201 and the backward FIG. 203 based on sensor data which is the detection results by the sonar units 40.

The forward FIG. 201 indicates the range of the vehicle 1B parked in the parking area that adjoins the parking area set at the parking position P in the width direction of the parking areas and that is closer to the current position of the host vehicle 1A.

The backward FIG. 203 indicates the range of the vehicle 1C parked in the parking area that adjoins the parking area set at the parking position P in the width direction of the parking areas and that is farther from the current position of the host vehicle 1A.

Although figures having detailed shapes of the vehicle 1B and the vehicle 1C may be created as the figures indicating the ranges occupied by the vehicle 1B and the vehicle 1C, it would increase the processing load of the parking assistance device 100 and the time for the processing. Hence, the map generation unit 133 puts together, out of the sensor data, the sensor data that can be determined to be data indicating one detected obstacle, and generates the forward FIG. 201 and the backward FIG. 203 indicating the ranges of obstacles. The map generation unit 133 determines that if the distance between the positions that sensor data indicates is smaller than or equal to a preset distance, the data indicates one obstacle.

The map generation unit 133 sets a coordinate system on the map, the coordinate system having the origin at the parking position P and the two axes orthogonal to each other, an X axis and a Y axis. The X axis, for example, is oriented in a direction in parallel with the vehicle-longitudinal direction of the host vehicle 1A at the time when the host vehicle 1A is parked at the parking position P, and the Y axis is oriented in a direction in parallel with the vehicle-width direction of the host vehicle 1A in the same state.

The map generation unit 133 selects the maximum value and the minimum value in the X-axis direction and the maximum value and the minimum value in the Y-axis direction, out of the sensor data that can be determined to be the data indicating one detected obstacle. For example, assume that a point X1 illustrated in FIG. 2 is selected as the maximum value in the X-axis direction, and that a point X2 illustrated in FIG. 2 is selected as the minimum value. Also, assume that a point Y1 illustrated in FIG. 2 is selected as the maximum value in the Y-axis direction, and that a point Y2 illustrated in FIG. 2 is selected as the minimum value.

The map generation unit 133 generates the rectangular figure defined by the sides passing through the selected four points X1, X2, Y1, and Y2, and in parallel with the X axis and the Y axis, as the figure indicating the range occupied by the obstacle. In the example illustrated in FIG. 2, the forward FIG. 201 has a first side 201A passing through X1 and in parallel with the Y axis, a second side 201B passing through X2 and in parallel with the Y axis, a third side 201C passing through Y1 and in parallel with the X axis, and a fourth side 201D passing through Y2 and in parallel with the X axis.

Note that the backward FIG. 203 also has a first side 203A, a second side 203B, a third side 203C, and a fourth side 203D.

In the example illustrated in FIG. 2, the parking position P is on the rear left side of the host vehicle 1A. The rear left side is the direction viewed from the driver sitting in the driver's seat of the host vehicle 1A and looking ahead of the host vehicle 1A.

The contact detection unit 135 performs a simulation on the map in which the host vehicle 1A is turned to the rear left at a preset angle from the position S0 of the host vehicle 1A and moved until the host vehicle 1A has approximately the same azimuth as the host vehicle 1A at the time when it is parked at the parking position P. In this process, the contact detection unit 135 judges whether the host vehicle 1A comes into contact with the obstacles recorded on the map. More specifically, the contact detection unit 135 judges whether the host vehicle 1A comes into contact with the forward FIG. 201 or the backward FIG. 203. If the contact detection unit 135 judges that the host vehicle 1A comes into contact with the forward FIG. 201 or the backward FIG. 203, the contact detection unit 135 identifies the position at which the host vehicle 1A comes into contact with the forward FIG. 201 or the backward FIG. 203.

Figure 3:
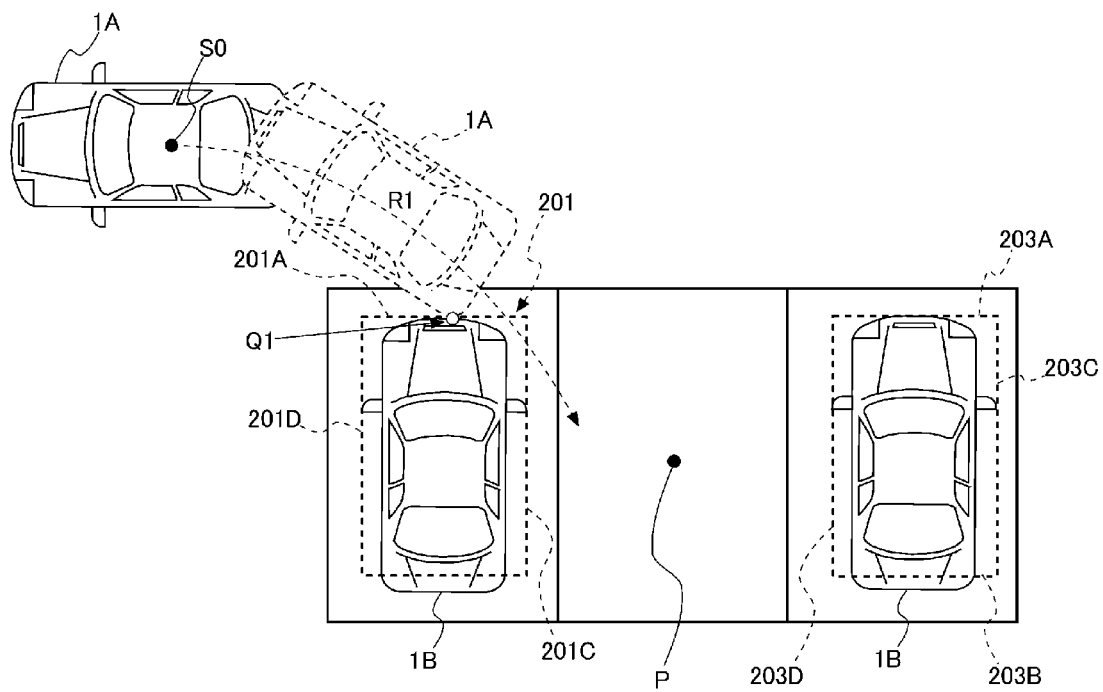
FIG. 3 is a diagram illustrating a case in which the host vehicle comes into contact with a forward figure.

FIG. 3 is a diagram illustrating a case in which the host vehicle 1A comes into contact with the forward FIG. 201. Specifically, FIG. 3 illustrates a case in which it is judged that the host vehicle 1A comes into contact with the forward FIG. 201 indicating the range of the vehicle 1B parked in the parking area closer to the position S0 of the host vehicle 1A.

The route R1 illustrated in FIG. 3 is a route for a case in which the host vehicle 1A is moved being turned to the rear left at a preset angle from the position S0 of the host vehicle 1A. The contact detection unit 135 judges that in the case in which the host vehicle 1A is moved along the route R1 illustrated in FIG. 3, the host vehicle 1A comes into contact with the forward FIG. 201, and the contact position is the point Q1 on the first side 201A.

In the case in which the contact position detected by the contact detection unit 135 is on any of the first side 201A, the second side 201B, the third side 201C, and the fourth side 201D defining the forward FIG. 201, the movement-direction determination unit 136 determines that the movement direction of the host vehicle is to be "backward movement".

Figure 4:
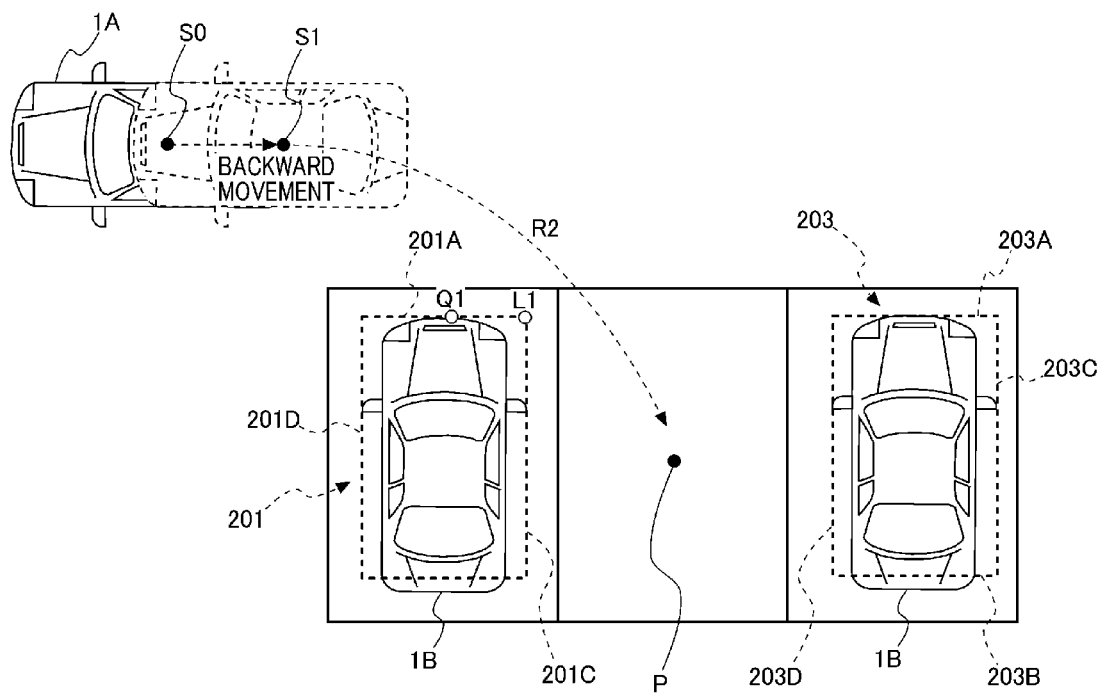
FIG. 4 is a diagram illustrating a parking route that is generated in the case in which a movement direction is determined to be backward movement.

FIG. 4 is a diagram illustrating a parking route R2 that the route generation unit 137 generates in a case in which the movement-direction determination unit 136 determines that the movement direction is to be "backward movement".

In the case in which the movement-direction determination unit 136 determines that the movement direction is to be "backward movement", the route generation unit 137, as illustrated in FIG. 4, generates the parking route R2 along which the host vehicle 1A is moved backward from the position S0 of the host vehicle 1A to the position S1 by a specified distance and then turned to the rear left. This specified distance can be determined based on the position of the contact with the forward FIG. 201 for the case in which the host vehicle 1A is moved along the route R1. For example, the route generation unit 137 sets the distance obtained by adding a preset distance to the distance between a contact position Q1 detected by the contact detection unit 135 and an apex L1 at the right end of the first side 201A, as the distance by which the host vehicle 1A is to be moved backward.

Figure 5:
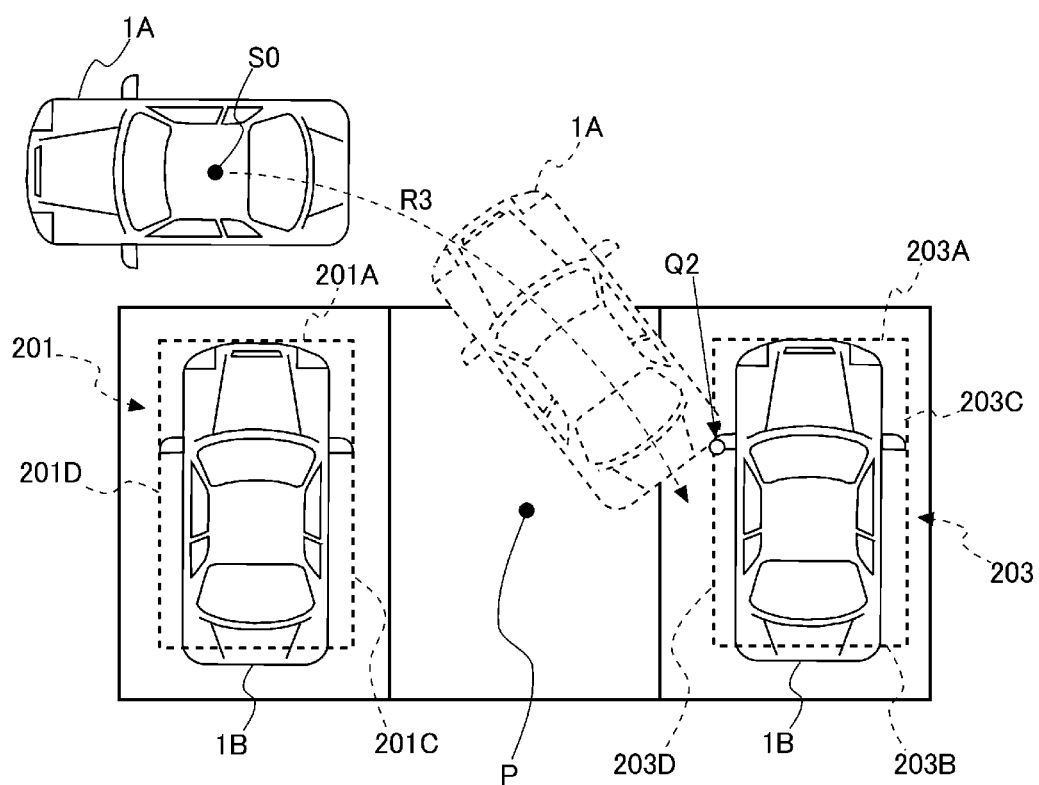
FIG. 5 is a diagram illustrating a case in which the host vehicle comes into contact with a backward figure.

FIG. 5 is a diagram illustrating a case in which the host vehicle 1A comes into contact with the backward FIG. 203.

The route R3 illustrated in FIG. 5 is a route for the case in which the host vehicle 1A is moved being turned to the rear left at a preset angle from the position S0 of the host vehicle 1A. The contact detection unit 135 judges that in the case in which the host vehicle 1A is moved along the route R3 illustrated in FIG. 3, the host vehicle 1A comes into contact with the backward FIG. 203, and the contact position is an point Q2 on the fourth side 203D. The fourth side 203D is a side of the backward FIG. 203 adjoining the parking area set at the parking position P.

In the case in which the contact position detected by the contact detection unit 135 is on the fourth side 203D of the backward FIG. 203 indicating the left side of the range of the vehicle 1C, the movement-direction determination unit 136 determines that the movement direction of the host vehicle is to be "backward turn". The fourth side 203D of the backward FIG. 203 adjoins the right side of the host vehicle 1A when the host vehicle 1A is parked at the parking position P.

Figure 6:
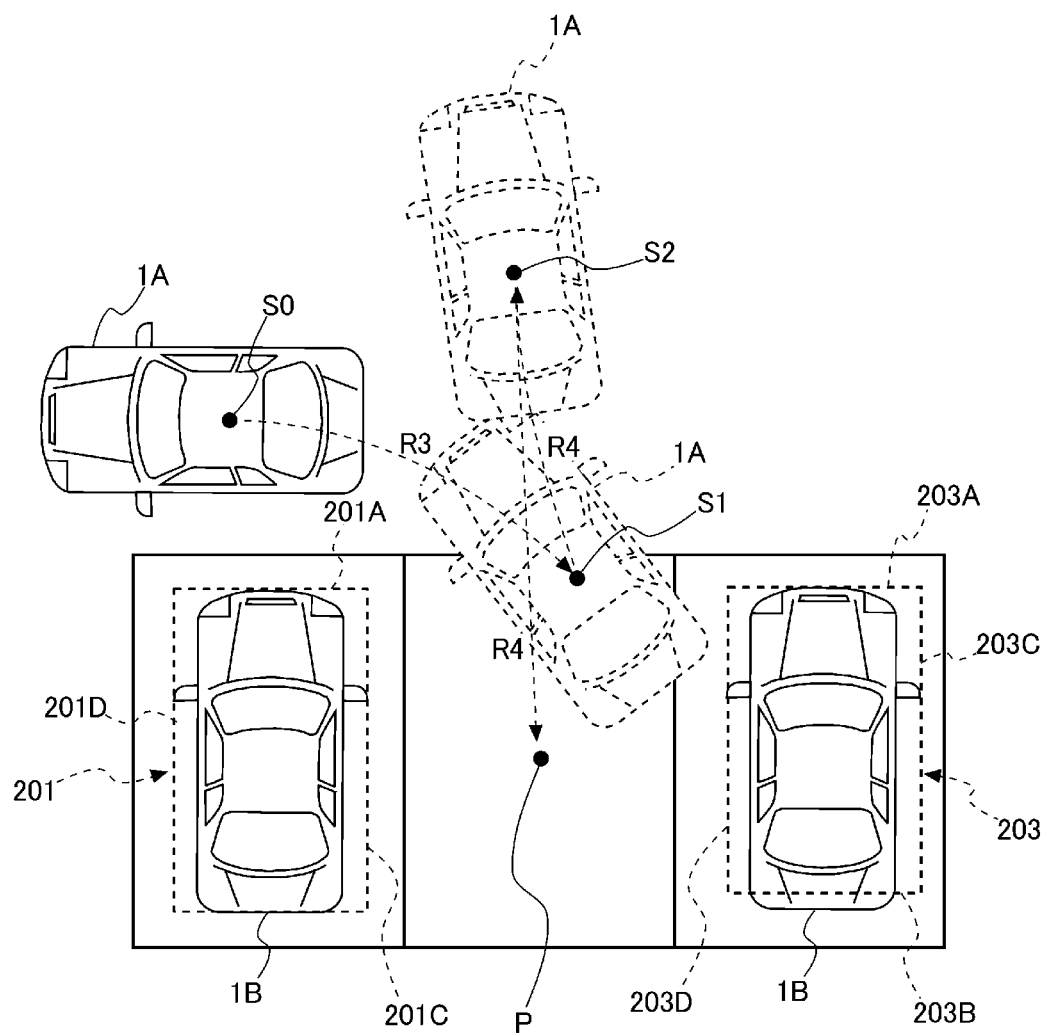
FIG. 6 is a diagram illustrating a parking route that is generated in the case in which the movement direction is determined to be backward turn.

FIG. 6 is a diagram illustrating a parking route R4 that the route generation unit 137 generates in the case in which the movement-direction determination unit 136 determines that the movement direction is to be "backward turn".

In the case in which the movement-direction determination unit 136 determines that the movement direction is to be "backward turn", the route generation unit 137, as illustrated in FIG. 6, generates a parking route R3 along which the host vehicle 1A is turned to the rear left from the position S0 of the host vehicle 1A. This parking route R3 is a route along which the host vehicle 1A is moved from the position S0 of the host vehicle 1A illustrated in FIG. 5, being turned to the rear left at a preset angle.

Although the host vehicle 1A starts moving along the parking route R3 generated by the route generation unit 137, in the case in which it is determined from the sensor data from the sonar units 40 and images captured by the image capturing unit 30 that the host vehicle 1A will come into contact with the vehicle 1C, the movement of the host vehicle 1A is stopped in the middle of the parking route R3. In FIG. 6, the position at which the host vehicle 1A is stopped is represented by the position S1.

When the host vehicle 1A stops at the position S1, the route generation unit 137 generates again a parking route R4 having the start position at the position S1. The parking route R4 illustrated in FIG. 6 is a route along which the host vehicle 1A is turned forward from the position S1 to a position S2 and then the host vehicle 1A is moved backward to the parking position P.

Figure 7:
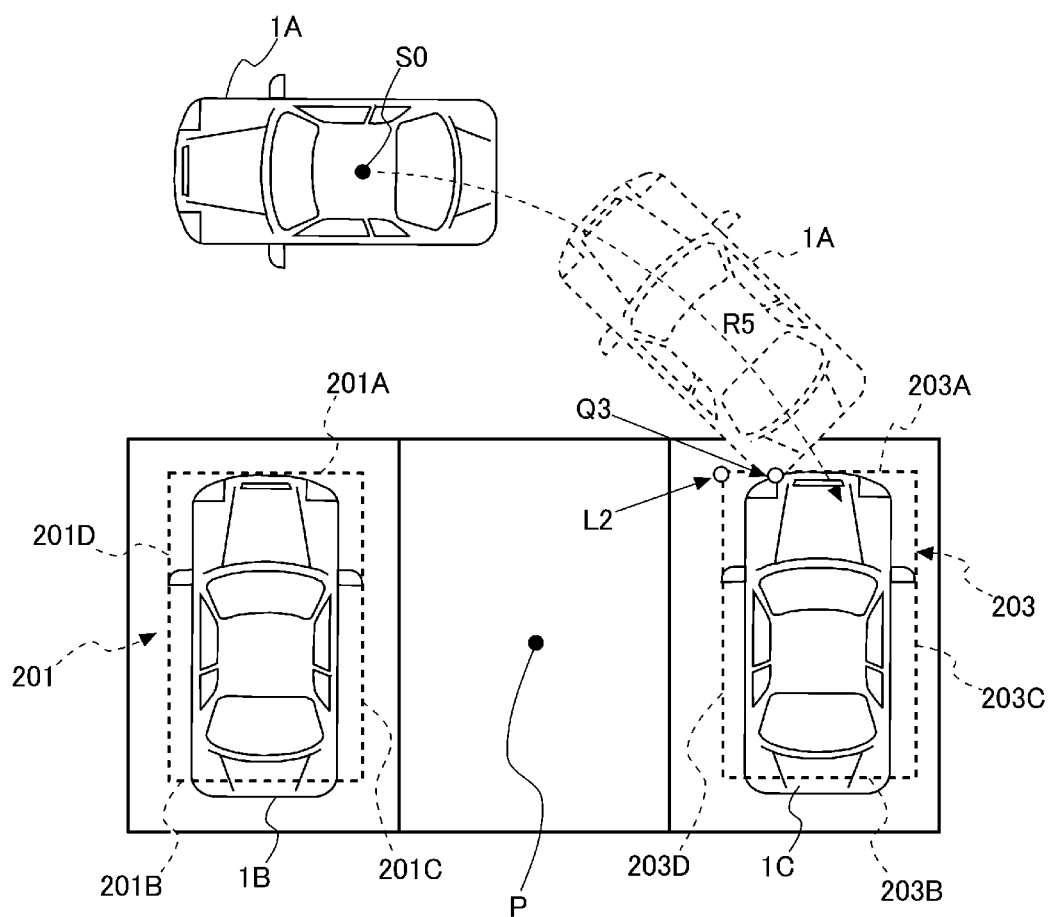
FIG. 7 is a diagram illustrating a case in which the host vehicle comes into contact with the backward figure.

FIG. 7 is a diagram illustrating a case in which the host vehicle 1A comes into contact with the backward FIG. 203.

The route R5 illustrated in FIG. 7 is a route for a case in which the host vehicle 1A is moved being turned to the rear left at a preset angle from the position S0 of the host vehicle 1A. The contact detection unit 135 judges that in the case in which the host vehicle 1A is moved along the route R5 illustrated in FIG. 7, the host vehicle 1A will comes into contact with the backward FIG. 203, and the contact position will be a point Q3 on the first side 203A. The first side 203A is a side of the forward FIG. 201 that faces the road in which the host vehicle 1A is positioned.

In the case in which the contact position detected by the contact detection unit 135 is on the first side 203A of the backward FIG. 203 indicating the front side of the range of the vehicle 1C, the movement-direction determination unit 136 determines that the movement direction of the host vehicle is to be "forward movement".

Figure 8:
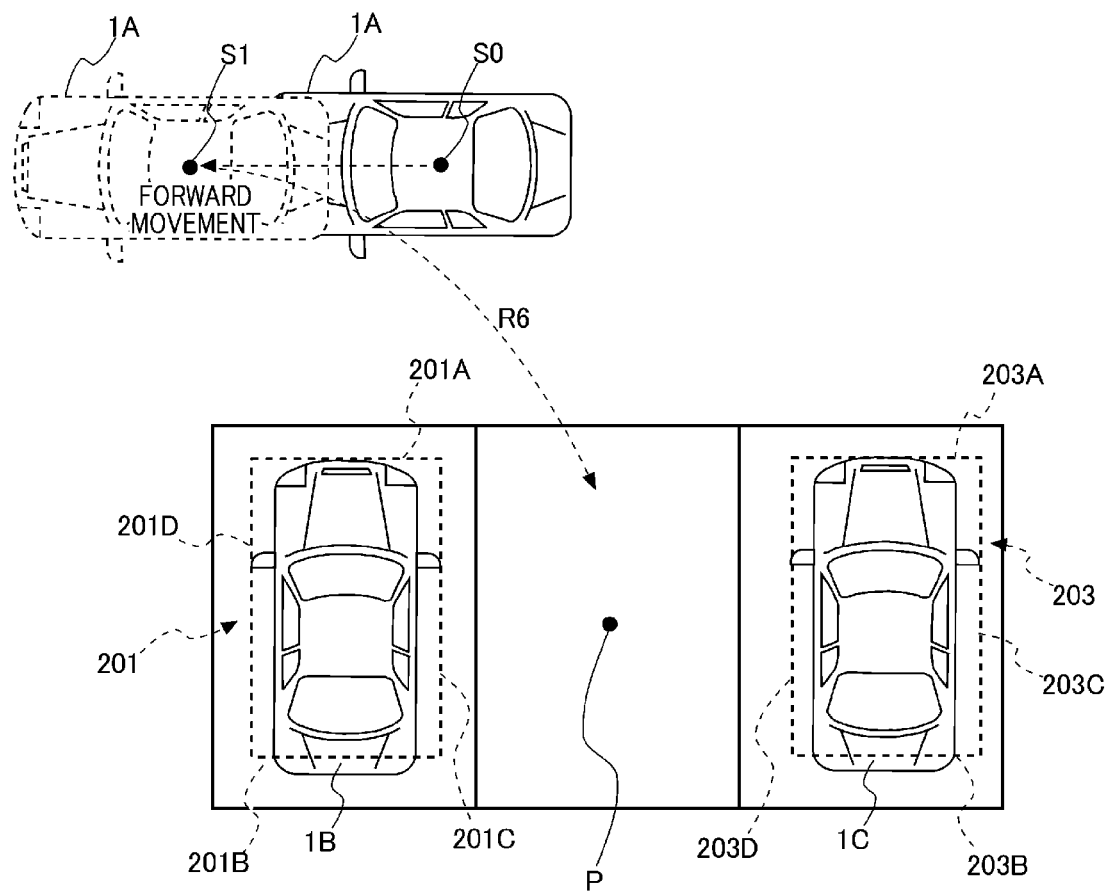
FIG. 8 is a diagram illustrating a parking route that is generated in the case in which the movement direction is determined to be forward movement.

FIG. 8 is a diagram illustrating a parking route R6 that is generated by the route generation unit 137 in the case in which the movement-direction determination unit 136 determines that the movement direction is to be "forward movement".

In the case in which the movement-direction determination unit 136 determines that the movement direction is to be "forward movement", the route generation unit 137, as illustrated in FIG. 8, generates the parking route R6 in which the host vehicle 1A is moved forward by a specified distance from the position S0 of the host vehicle 1A to the position S1 and then turned to the rear left. This specified distance can be determined based on the position of the contact with the backward FIG. 203 for the case in which the host vehicle 1A is moved along the route R5. For example, the route generation unit 137 sets the distance obtained by adding a preset distance to the distance between the contact position Q3 detected by the contact detection unit 135 and the apex L2 at the left end of the first side 203A, as the distance by which the host vehicle 1A is to be moved forward.

The control-information generation unit 138 receives input of information on the parking route generated by the route generation unit 137. Based on the inputted information on the parking route, the control-information generation unit 138 generates control information that the vehicle control unit 70 executes. The control information is information according to which the vehicle control unit 70 controls the steering device 81, the driving device 83, the braking device 85, and the transmission device 87 so that the host vehicle 1A travels to the parking position P automatically. The control-information generation unit 138 outputs the generated control information to the vehicle control unit 70 via the input-output interface 110.

The display control unit 139 generates display data that the touch panel 65 displays, and outputs the generated display data to the display device 60. The display device 60 displays images based on the display data on the touch panel 65.

Although FIGS. 2 to 8 illustrate a case in which the parking mode at the parking position P is perpendicular parking, the parking mode at the parking position P may be angle parking. Angle parking is a parking mode of parking the host vehicle 1A into one of the parking areas provided to be angled to the pathway in front of or behind the parking areas.

Although FIGS. 2 to 8 illustrate a case in which the parking position P is on the rear left side of the position S0 of the host vehicle 1A, the parking position P may be on any of the right side, the front left side, and the front right side of the position S0 of the host vehicle 1A.

The operation of the parking assistance device 100 will be described with reference to the flowcharts illustrated in FIGS. 9 and 10.

First, the parking assistance device 100 judges whether it has received a parking-assistance start operation (step S1). For example, the parking assistance device 100 judges that it has received a start operation when a parking-assistance start button displayed on the touch panel 65 is touched and pressed. If the parking assistance device 100 has not received a parking-assistance start operation (NO at step S1), it keeps waiting to start the next process until it receives a start operation.

If the parking assistance device 100 has received the parking-assistance start operation (YES at step S1), the parking assistance device 100 obtains surrounding-area information, which is information on the surrounding areas of the host vehicle 1A, from the detection device 20 and obtains the position information on the host vehicle 1A from the position detection unit 10 (step S2). Step S2 corresponds to the obtaining step. Based on the obtained surrounding-area information, the parking assistance device 100 stores, in the memory 120, the current position of the host vehicle 1A, the positions of obstacles around the host vehicle 1A, and the positions of parking spots indicated by white lines or the like formed on the road surface and generates a map (step S3). Step S3 corresponds to the generation step. In this process, the parking assistance device 100 puts together the sensor data that can be determined to be detection data indicating one obstacle, out of the sensor data measured by the sonar units 40 and generates a rectangular figure indicating the range of the obstacle on the map.

Next, the parking assistance device 100 refers to the generated map to detect a parking spot available for the host vehicle 1A to park (step S4). The parking assistance device 100 sets, in the detected parking spot, the azimuth and the position of the host vehicle 1A at the time when it is parked and determines a parking position P at which the host vehicle 1A is to be parked (step S5). Step S5 corresponds to the area determination step.

Next, the parking assistance device 100 moves the host vehicle 1A on the generated map by turning it backward at a preset turn angle from the position S0 of the host vehicle 1A (step S6). Then, the parking assistance device 100 judges whether an obstacle with which the host vehicle 1A comes into contact has been detected (step S7). Steps S6 and S7 correspond to the detection step. If the parking assistance device 100 was unable to detect an obstacle with which the host vehicle 1A comes into contact (NO at step S7), the parking assistance device 100 determines that the movement direction of the host vehicle 1A is to be "backward turn" (step S10). Step S10 corresponds to the determination step. If the parking assistance device 100 detected an obstacle with which the host vehicle 1A comes into contact (YES at step S7), the parking assistance device 100 identifies the position at which the host vehicle 1A comes into contact with the obstacle. The following description will be based on a case in which the vehicle 1B is positioned on the left side of the parking position P determined at step S5, at which the forward FIG. 201 is formed on the map, and the vehicle 1C is positioned on the right side of the parking position P, at which the backward FIG. 203 is formed on the map.

In the case in which the parking assistance device 100 identifies that the host vehicle 1A comes into contact with the forward FIG. 201 at a position on any of the first side 201A, the second side 201B, the third side 201C, and the fourth side 201D (YES at step S8), the parking assistance device 100 determines that the movement direction of the host vehicle 1A is to be "backward movement" (step S12). Step S12 corresponds to the determination step.

In the case in which the position of contact with the host vehicle 1A is not on the forward FIG. 201 (NO at step S8) but on the fourth side 203D of the backward FIG. 203 corresponding to the left side of the range of the vehicle 1C (YES at step S9), the parking assistance device 100 determines that the movement direction of the host vehicle is to be "backward turn" (step S10). Step S10 corresponds to the determination step. The fourth side 203D of the backward FIG. 203 is a side that adjoins the right side of the host vehicle 1A when the host vehicle 1A is parked at the parking position P.

In the case in which the position of contact with the host vehicle 1A is not on the fourth side of the backward FIG. 203 (NO at step S9), the parking assistance device 100 judges that the position of contact with the host vehicle 1A is the first side 203A of the backward FIG. 203 and judges that the movement direction of the host vehicle 1A is to be "forward movement" (step S11). Step S11 corresponds to the determination step.

Next, the parking assistance device 100 generates a parking route corresponding to the determined movement direction (step S13). In the case in which the parking assistance device 100 determined at step S10 that the movement direction is to be "backward turn", the parking assistance device 100 generates a parking route along which the host vehicle 1A is moved backward by a specified distance from the position S0 of the host vehicle 1A to the position S1 and then turned to the rear left as illustrated in FIG. 4. In the case in which the parking assistance device 100 determines at step S12 that the movement direction is to be "backward turn", the parking assistance device 100 generates a parking route along which the host vehicle 1A is turned to the rear left from the position S0 of the host vehicle 1A as illustrated in FIG. 6. In the case in which the parking assistance device 100 determined at step S11 that the movement direction is to be "forward movement", the parking assistance device 100 generates a parking route along which the host vehicle 1A is moved forward by a specified distance from the position S0 of the host vehicle 1A to the position S1 and then turned to the rear left, as illustrated in FIG. 8.

Next, the parking assistance device 100 generates control information corresponding to the generated parking route (step S14) and outputs the generated control information to the vehicle control unit 70 via the input-output interface 110 (step S15). The vehicle control unit 70 controls the steering device 81, the driving device 83, the braking device 85, and the transmission device 87 according to the inputted control information.

Next, the parking assistance device 100 obtains the position information from the position detection unit 10 (step S16) and corrects the obtained position information by using a well-known dead reckoning method. The parking assistance device 100 judges from the corrected position information whether the current position of the host vehicle 1A is the parking position P (step S17). If the parking assistance device 100 judges that the current position of the host vehicle 1A is the parking position P (YES at step S17), the parking assistance device 100 ends this procedure.

If the current position of the host vehicle 1A is not the parking position P (step S17), the parking assistance device 100 judges whether the host vehicle 1A has stopped moving (step S18). The parking assistance device 100 obtains information from the vehicle control unit 70 and judges from the obtained information whether the host vehicle 1A has stopped moving. In the case in which an obstacle is detected from images captured by the image capturing unit 30 and sensor data from the sonar units 40, the vehicle control unit 70 controls the braking device 85 and the driving device 83 to stop the movement of the host vehicle 1A.

If the host vehicle 1A has not stopped moving (NO at step S18), the parking assistance device 100 returns to step S16 and obtains the position information again. If the host vehicle 1A has stopped moving (YES at step S18), the parking assistance device 100 obtains surrounding-area information, which is information on the surrounding areas of the host vehicle 1A, from the detection device 20 (step S19). The parking assistance device 100 generates a map based on the obtained surrounding-area information and generates a parking route again (step S20). After that, the parking assistance device 100 generates control information corresponding to the generated parking route, outputs the generated control information to the vehicle control unit 70 (step S22), and returns to the process at step S16.

As has been described above, the parking assistance device 100 of the present embodiment includes the input-output I/F 110, the condition obtaining unit 132, the map generation unit 133, the parking-area determination unit 134, the contact detection unit 135, and the movement-direction determination unit 136.

The input-output I/F 110 is connected to the position detection unit 10 and the detection device 20, which are external devices, via the communication bus 5.

The condition obtaining unit 132 obtains, via the input-output I/F 110, surrounding conditions of the host vehicle 1A detected by the detection device 20 and position information on the host vehicle 1A detected by the position detection unit 10.

Based on the obtained surrounding conditions, the map generation unit 133 generates a map that records the positions of obstacles around the host vehicle 1A and the positions of parking areas available for the host vehicle 1A to park.

The parking-area determination unit 134 determines a parking area to park the host vehicle 1A out of the parking areas recorded on the map, based on the generated map and the obtained position information.

The contact detection unit 135 performs a simulation on the map in which the host vehicle 1A is turned until the host vehicle 1A has approximately the same azimuth as the host vehicle 1A at the time when it is parked at the parking area and detects the position at which the host vehicle 1A comes into contact with the obstacles recorded on the map.

The movement-direction determination unit 136 determines the movement direction in which the host vehicle 1A is to be moved from the position that the position information indicates, based on the contact position detected by the contact detection unit 135.

Thus, the parking assistance device of the present embodiment only has to generate a parking route for moving the host vehicle 1A in the movement direction determined by the movement-direction determination unit 136 and does not need to generate a parking route for moving the host vehicle 1A forward or a parking route for moving the host vehicle 1A backward, and this shortens the calculation time necessary to generate parking routes.

The map generation unit 133 records rectangular figures indicating the ranges occupied by obstacles on the map, and the contact detection unit 135 detects contacts between the host vehicle 1A and the figures recorded on the map.

Thus, it is possible to shorten the time necessary to generate the map and the time necessary to detect the contact positions at which the host vehicle 1A comes into contact with obstacles.

In the case in which the contact detection unit 135 judges that the host vehicle 1A will come into contact with the forward FIG. 201 indicating the range of the vehicle 1B parked in the parking area that adjoins the parking area set at the parking position P in the width direction and that is closer to the current position of the host vehicle 1A indicated by the position information, the movement-direction determination unit 136 determines that the movement direction of the host vehicle 1A is to be backward movement.

Thus, it is possible to determine a suitable movement direction for the host vehicle 1A based on the position of contact between the host vehicle 1A and the obstacle.

In the case in which the contact detection unit 135 judges that the host vehicle 1A will come into contact with the backward FIG. 203 indicating the range of the vehicle 1C parked in the parking area that adjoins the parking area set at the parking position P in the width direction and that is farther from the current position of the host vehicle 1A indicated by the position information, and in the case in which the contact position on the backward FIG. 203 is on the fourth side 203D of the backward FIG. 203, adjoining the parking area, the movement-direction determination unit 136 determines that the movement direction of the host vehicle 1A is to be backward turn.

Thus, it is possible to determine a suitable movement direction for the host vehicle 1A based on the position of contact between the host vehicle 1A and the obstacle.

In the case in which the contact detection unit 135 judges that the host vehicle 1A will come into contact with the backward FIG. 203 indicating the range of the vehicle 1C parked in the parking area that adjoins the parking area set at the parking position P in the width direction and that is farther from the current position of the host vehicle 1A indicated by the position information, and in the case in which the contact position on the backward FIG. 203 is on the first side 203A of the backward FIG. 203, facing the road in which the host vehicle 1A is positioned, the movement-direction determination unit 136 determines that the movement direction of the host vehicle 1A is to be forward movement.

Thus, it is possible to determine a suitable movement direction for the host vehicle 1A based on the position of contact between the host vehicle 1A and the obstacle.

The foregoing embodiment is just an example of an aspect of the present invention, and thus, the embodiment can be modified or applied arbitrarily within the scope not departing from the gist of the present invention.

For example, in the foregoing embodiment, in the case in which the contact position between the host vehicle 1A and the backward FIG. 203 is on the first side 203A of the backward FIG. 203, it is judged that the movement direction of the host vehicle 1A is to be "forward movement".

In this case, the parking assistance device 100 may detect the width of the road in which the host vehicle 1A is positioned, based on surrounding conditions, and if the detected road width is larger than a preset road width, the parking assistance device 100 may determine that the movement direction of the host vehicle 1A is to be "backward turn". Specifically, the parking assistance device 100, as illustrated in FIG. 6, makes the host vehicle 1A travel along a parking route that turns the host vehicle 1A from the position S0 of the host vehicle 1A to the rear left. After that, when it is judged from sensor data from the sonar units 40 and images captured by the image capturing unit 30 that the host vehicle 1A will come into contact with the vehicle 1C, and the host vehicle 1A stops traveling halfway on the parking route R3, the parking assistance device 100 generates again a parking route R4 having the start position at the position S1. This parking route is a route that turns the host vehicle 1A to the front right and then moves it backward and park it at the parking position P, as illustrated in FIG. 6.

The block diagram illustrating the configuration of the parking assistance device 100 in FIG. 1 is a schematic diagram in which the constituents are defined by classification according to the main processes to make it easy to understand the invention of the present application, and hence, the configuration of the parking assistance device 100 can be classified into a larger number of constituents according to the processes. Alternatively, the configuration can be classified such that one constituent executes more processes.

In addition, the parking assistance device 100 in FIG. 1 may have a configuration integrally including at least one of the position detection unit 10 and the detection device 20.

In the case of implementing the parking assistance method of the present invention by using a computer, the program that this computer executes may be stored in a recording medium or may be provided through a transmission medium that transmits this program. The recording medium may be a magnetic or optical recording medium or a semiconductor memory device. Specifically, examples of the recording medium include portable or fixed recording media such as a flexible disk, a hard disk drive (HDD), a Compact Disk Read Only Memory (CD-ROM), a DVD, a Blu-ray (registered trademark) Disc, a magneto-optical disk, a flash memory, and a card recording medium. The above recording medium may be a nonvolatile storage device such as ROM and an HDD included in the parking assistance device 100.

Figure 9:
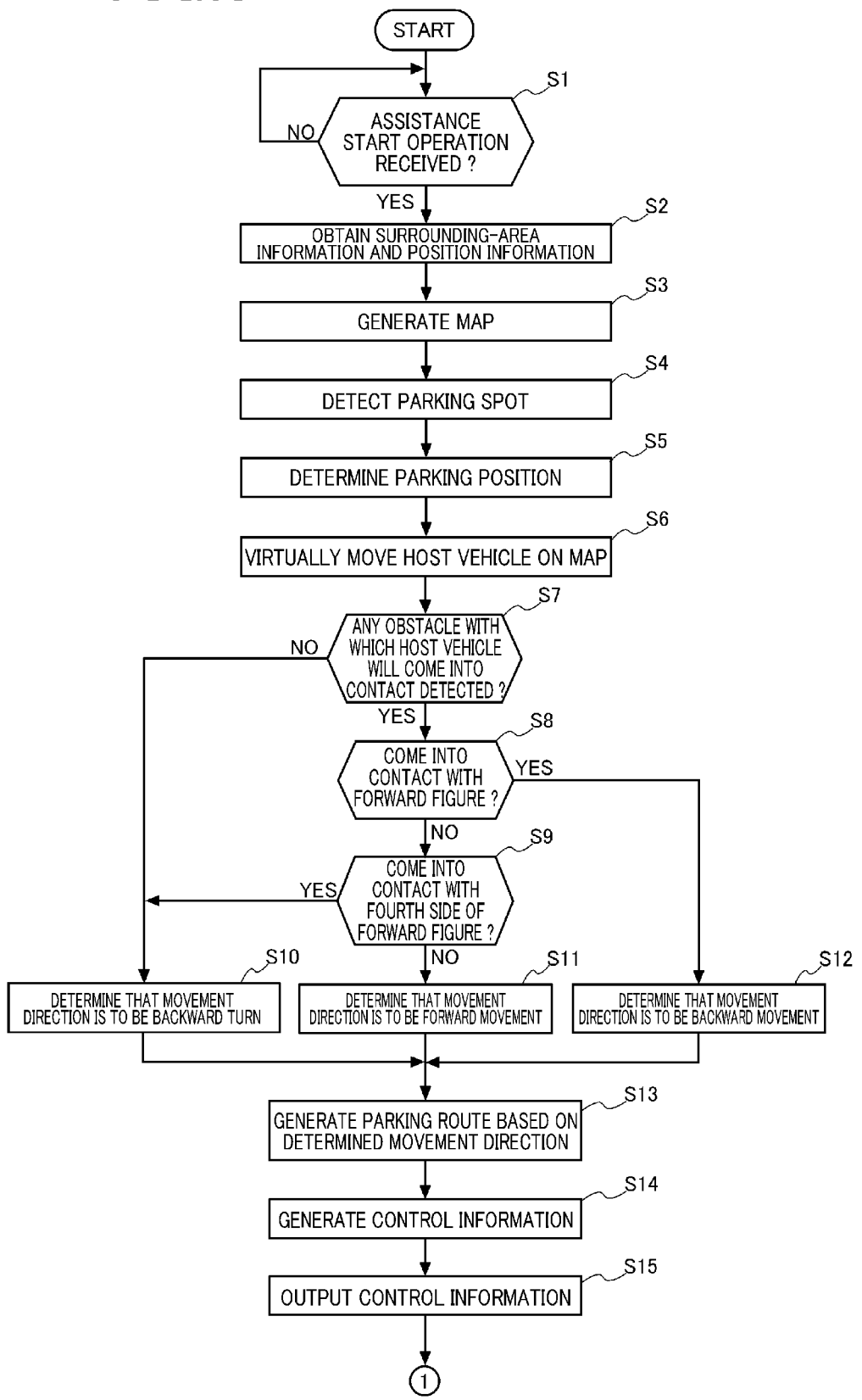
FIG. 9 is a flowchart illustrating the operation of a parking assistance device.

The process units in the flowcharts illustrated in FIGS. 9 and 10 are defined by division according to the main processes, to make it easy to understand the processes of the parking assistance device 100, and thus, the way of dividing the processes into process units and the names of the process units do not limit the present invention. The processes of the parking assistance device 100 may be divided into a larger number of process units according to the processes. The processes of the parking assistance device 100 may be divided such that one process unit includes more processes.

REFERENCE SIGNS LIST 1A vehicle
1B another vehicle
1C another vehicle
3 in-vehicle device
5 communication bus
10 position detection unit
20 detection device
30 image capturing unit
31 front camera
32 rear camera
33 left-side camera
34 right-side camera
40 sonar unit
50 wireless communication device
63 touch sensor
65 touch panel
70 vehicle control unit
80 travel driving device
81 steering device
83 driving device
85 braking device
87 transmission device
100 parking assistance device
110 input-output interface
120 memory
130 processor
131 position obtaining unit
132 condition obtaining unit
133 map generation unit
134 parking-area determination unit
135 contact detection unit
136 movement-direction determination unit
137 route generation unit
138 control-information generation unit
139 display control unit
201 forward FIG.
201A first side
201B second side
201C third side
201D fourth side
203 backward FIG.
203A first side
203B second side
203C third side
203D fourth side
L1 apex
L2 apex
P parking position

What is claimed is:

1. A parking assistance device comprising:
a processor;
a memory storing a map;
a global navigation satellite system receiver receiving signals transmitted from satellites; and
a detection device including a front camera that captures images of an area ahead of a vehicle; a rear camera that captures images of an area behind the vehicle; a left-side camera that captures images of an area on a left side of the vehicle; and a right-side camera that captures images of an area on a right side of the vehicle,
wherein the detection device obtains the images captured by the front camera, the rear camera, the left-side camera, and the right-side camera as surrounding information detecting a surrounding condition around the vehicle and the images are stored in the memory,
the global navigation satellite system receiver obtains position information indicating a current position of the vehicle and the position information is stored in the memory,
the processor generates the map that records a position of the vehicle, a position of an obstacle around the vehicle, a distance to the obstacle, a position of a parking area to park the vehicle indicated by lines painted on a road surface,
the processor determines the parking area to park the vehicle out of parking areas recorded on the map, based on a generated map and the obtained position information,
the processor virtually performs a simulation on the map in which the vehicle is turned at a preset turn angle from the current position of the vehicle until a longitudinal direction of the vehicle has approximately a same orientation as a longitudinal direction of the parking area, and while the turning of the vehicle performs, detects a contact position at which the vehicle comes into contact with the obstacle recorded on the map,
the processor determines whether the once performs a forward movement, a backward movement, or a backward turn from the current position indicated by the position information when the simulation started on the map, based on the detected contact position, and generates a parking route in which the vehicle is parked in the parking area by moving the vehicle in a determined movement of the forward movement, the backward movement, or the backward turn by a specified distance,
the parking area where the vehicle is parked is a first parking area,
the processor sets a forward figure indicating a range of another vehicle parked in a second parking area that adjoins the first parking area in a width direction and that is closer to the current position of the vehicle, the processor sets a backward figure indicating a range of another vehicle parked in the parking area that adjoins the parking area in the width direction and that is farther from the current position of the vehicle, the processor sets a coordinate system having an origin as a center of the first parking area and two axes of an X axis and a Y axis orthogonal through the origin, and the X axis is oriented in a direction in parallel with a vehicle-longitudinal direction of the vehicle at a time when the vehicle is parked, and the Y axis is oriented in a direction in parallel with a vehicle-width direction of the vehicle, the processor respectively selects a maximum value X1 and a minimum value X2 in the X axis direction and a maximum value Y1 and a minimum value Y2 in the Y axis direction of another vehicle parked in the second parking area and a third parking area, and a rectangular figure defined by the sides passing through selected four points X1, X2, Y1, and Y2, and in parallel with the X axis and the Y axis is the forward figure and the backward figure, the forward figure and the backward figure have a first side passing through the maximum value X1 and in parallel with the Y axis, a second side passing through the minimum value X2 and in parallel with the Y axis, a third side passing through the maximum value Y1 and in parallel with the X axis, and a fourth side passing through the minimum value Y2 and in parallel with the X axis, the processor detects a contact position at which the vehicle contacts the forward figure and the backward figure recorded on the map in the simulation, when the contact position is at one of the first, second, third, fourth sides configuring the forward figure, the processor determines that the vehicle once performs the backward movement from the current position of the vehicle, when the contact position is at the first, second, third, fourth sides of the backward figure, the processor determines that the vehicle once performs the backward turn from the current position of the vehicle, and when the contact position is at one of the first, second, third, fourth sides of the backward figure, the processor determines that the vehicle once performs the forward movement from the current position of the vehicle.

2. The parking assistance device according to claim 1, wherein
the processor records, on the map, a rectangular figure indicating a range occupied by the obstacle, and
detects a contact between the vehicle and the rectangular figure recorded on the map.

3. The parking assistance device according to claim 2, wherein
in a case in which the processor judges that the vehicle comes into contact with the rectangular figure indicating a range of another vehicle parked in a parking area that adjoins the parking area in a width direction and is closer to the current position of the vehicle indicated by the position information, the processor determines that a movement direction of the vehicle is to be the backward movement.

4. The parking assistance device according to claim 2, wherein
in a case in which the processor judges that the vehicle comes into contact with the rectangular figure indicating a range of another vehicle parked in a parking area that adjoins the parking area in a width direction and is farther from the current position of the vehicle indicated by the position information, and in the case in which the contact position on the rectangular figure is on a side of the rectangular figure, the side adjoining the parking area, the processor determines that a movement direction of the vehicle is to be the backward turn.

5. The parking assistance device according to claim 2, wherein
in a case in which the processor judges that the vehicle comes into contact with the rectangular figure indicating a range of another vehicle parked in a parking area that adjoins the parking area in a width direction and is farther from the current position of the vehicle indicated by the position information, and in the case in which the contact position on the rectangular figure is on a side of the rectangular figure, the side facing a road in which the vehicle is positioned, the processor determines that a movement direction of the vehicle is to be the forward movement.

6. A parking assistance method by using a parking assistance device including a processor; a memory storing a map; a global navigation satellite system receiver receiving signals transmitted from satellites; and a detection device, the parking assistance method comprising the steps of:

obtaining images captured by the detection device including a front camera that captures images of an area ahead of a vehicle, a rear camera that captures images of an area behind the vehicle, a left-side camera that captures images of an area on a left side of the vehicle, and a right-side camera that captures images of an area on a right side of the vehicle as surrounding information detecting a surrounding condition around the vehicle and storing the images in the memory, obtaining position information indicating a current position of the vehicle by the global navigation satellite system receiver and storing the position information in the memory;

generating the map by the processor that records a position of the vehicle, a position of an obstacle around the vehicle, a distance to the obstacle, a position of a parking area to park the vehicle indicated by lines painted on a road surface;

determining the parking area to park the vehicle out of parking areas recorded on the map, based on a generated map and the obtained position information by the processor;

performing a simulation virtually on the map by the processor in which the vehicle is turned at a preset turn angle from the current position of the vehicle until a longitudinal direction of the vehicle has approximately a same orientation as a longitudinal direction of the parking area, and while the turning of the vehicle performs, detecting a contact position at which the vehicle comes into contact with the obstacle recorded on the map; and determining whether the vehicle once performs a forward movement, a backward movement, or a backward turn from the current position indicated by the position information when the simulation started on the map, based on the detected contact position, by the processor, wherein the processor generates a parking route in which the vehicle is parked in the parking area by moving the vehicle in a determined movement of the forward movement, the backward movement, or the backward turn by a specified distance, wherein the parking area where the vehicle is parked is a first parking area, setting a forward figure indicating a range of another vehicle parked in a second parking area that adjoins the first parking area in a width direction and that is closer to the current position of the vehicle, setting a backward figure indicating a range of another vehicle parked in the parking area that adjoins the parking area in the width direction and that is farther from the current position of the vehicle, setting a coordinate system having an origin as a center of the first parking area and two axes of an X axis and a Y axis orthogonal through the origin, and the X axis is oriented in a direction in parallel with a vehicle-longitudinal direction of the vehicle at a time when the vehicle is parked, and the Y axis is oriented in a direction in parallel with a vehicle-width direction of the vehicle, respectively selects a maximum value X1 and a minimum value X2 in the X axis direction and a maximum value Y1 and a minimum value Y2 in the Y axis direction of another vehicle parked in the second parking area and a third parking area, and a rectangular figure defined by the sides passing through selected four points X1, X2, Y1, and Y2, and in parallel with the X axis and the Y axis is the forward figure and the backward figure, the forward figure and the backward figure have a first side passing through the maximum value X1 and in parallel with the Y axis, a second side passing through the minimum value X2 and in parallel with the Y axis, a third side passing through the maximum value Y1 and in parallel with the X axis, and a fourth side passing through the minimum value Y2 and in parallel with the X axis, detecting a contact position at which the vehicle contacts the forward figure and the backward figure recorded on the map in the simulation, when the contact position is at one of the first, second, third, fourth sides configuring the forward figure, determining that the vehicle once performs the backward movement from the current position of the vehicle, when the contact position is at the first, second, third, fourth sides of the backward figure, determines that the vehicle once performs the backward turn from the current position of the vehicle, and when the contact position is at one of the first, second, third, fourth sides of the backward figure, determining that the vehicle once performs the forward movement from the current position of the vehicle.

7. The parking assistance device according to claim 1, wherein the processor calculates the specified distance when the vehicle once performs the forward movement, the backward movement, or the backward turn by adding a preset distance to a distance between the contact position detected on the map and an apex at the first, second, third, fourth sides at which the vehicle contacts in the simulation.

* * * * *